United States Patent
Yang et al.

(10) Patent No.: US 11,222,614 B1
(45) Date of Patent: Jan. 11, 2022

(54) IMAGE PROCESSING METHOD, ASSEMBLY AND SYSTEM WITH AUTO-ADJUSTING GAMMA VALUE

(71) Applicant: NOVATEK MICROELECTRONICS CORP., Hsinchu (TW)

(72) Inventors: Yun-Shu Yang, Changhua County (TW); Yen-Tao Liao, Hsinchu (TW); Jen-Ta Yang, Zhubei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/985,622

(22) Filed: Aug. 5, 2020

(51) Int. Cl.
*G09G 5/10* (2006.01)
*G06F 1/16* (2006.01)

(52) U.S. Cl.
CPC .............. *G09G 5/10* (2013.01); *G06F 1/1616* (2013.01); *G09G 2320/028* (2013.01); *G09G 2320/0276* (2013.01); *G09G 2320/0673* (2013.01); *G09G 2320/08* (2013.01)

(58) Field of Classification Search
CPC .... G09G 5/10; G09G 5/06; G09G 2320/0276; G09G 2320/028; G09G 2320/0673; G09G 2320/08; G06F 1/1616
See application file for complete search history.

(56) References Cited

U.S. PATENT DOCUMENTS

| | | | |
|---|---|---|---|
| 7,903,171 B2* | 3/2011 | Takabatake | H04N 7/18 348/376 |
| 10,204,592 B1* | 2/2019 | Trim | H04N 1/6075 |
| 2006/0132874 A1* | 6/2006 | Ishikawa | H04N 1/60 358/518 |
| 2017/0124934 A1* | 5/2017 | Verbeure | G09G 3/3611 |
| 2017/0278483 A1* | 9/2017 | Miyazawa | G09G 3/3611 |

* cited by examiner

*Primary Examiner* — Antonio A Caschera
(74) *Attorney, Agent, or Firm* — JCIPRNET

(57) ABSTRACT

An image processing method with auto-adjusting gamma value is provided. This image processing method includes: receiving a detected value dependent upon a view angle between a normal direction of a screen and a sight direction of a viewer to the screen; receiving an original video frame with a plurality of pixels; determining at least one gamma table to obtain a gamma value for a pixel of the plurality of pixels according to the detected value, wherein there is an original pixel value corresponding to the pixel; and generating and outputting a corrected pixel value of the pixel based on the gamma value and the original pixel value of the pixel, wherein the screen is configured to show a corrected video frame having the pixel with the corrected pixel value. An image processing assembly and an image processing system are also provided.

17 Claims, 6 Drawing Sheets

S3 selecting at least one candidate gamma table from a plurality of candidate gamma tables according to the detected value — S31 determining the gamma value according to the selected at least one candidate gamma value table and the original pixel value — S32

IMAGE PROCESSING METHOD, ASSEMBLY AND SYSTEM WITH AUTO-ADJUSTING GAMMA VALUE

BACKGROUND

1. Technical Field

The disclosure relates to an image processing method, an assembly, and a system with auto-adjusting gamma value, more particularly to an image processing method, an assembly, and a system able to adjust gamma value according to a detected value dependent upon a view angle between a normal direction of a screen and a sight direction of a viewer to the screen.

2. Related Art

A display such as liquid crystal display (LCD) generally has an off-angle viewing problem where the image may possess color distortion or color washout at a side view angle, which means that a user feels the display panel brighter than usual when looking at the side view angle. Particularly, sometimes the view angle between a normal direction of a screen of the LCD and a sight direction of a viewer to the screen changes, such as when the viewer changes his/her posture after keeping the same posture for a while, thus this off-angle viewing problem exists and bothers the viewer.

A conventional way to solve this off-angle viewing problem is moving or rotating the screen to decrease said view angle. However, it is inconvenient for the viewer to move or rotate the screen every time when the view angle changes, especially when the display is adapted to a TV set which is usually distant from the viewer in a room. Another way for solving this off-angle viewing problem is adjusting the gamma value as the viewer changes his/her posture. Although this gamma adjustment may be performed by the viewer through a remote controller, it is impossible for a viewer to precisely adjust the gamma value to a preferable value immediately so as to avoid the off-angle viewing problem. Therefore, there is a need for an improvement in the display to provide a way to solve the off-angle viewing problem fast, and thus carrying out a better user experience.

SUMMARY

An image processing method with auto-adjusting gamma value is disclosed according one embodiment of the present disclosure, with said image processing method configured to be performed by an image processing assembly. The image processing method comprises: receiving a detected value dependent upon a view angle between a normal direction of a screen and a sight direction of a viewer to the screen; receiving an original video frame with a plurality of pixels; determining at least one gamma table to obtain a gamma value for a pixel of the plurality of pixels according to the detected value, wherein there is an original pixel value corresponding to said pixel; and generating and outputting a corrected pixel value of said pixel based on the gamma value of the at least one gamma table and the original pixel value of the pixel, wherein the screen is configured to show a corrected video frame having said pixel with the corrected pixel value.

An image processing assembly with auto-adjusting gamma value is disclosed according another embodiment of the present disclosure. The image processing assembly includes a memory and a processor. The memory stores a plurality of candidate gamma tables and a plurality of predetermined detected values, with the plurality of candidate gamma tables corresponding to the plurality of predetermined detected values respectively. The processor electrically connects to the memory, receives a detected value dependent upon a view angle between a normal direction of a screen and a sight direction of a viewer to the screen and an original video frame having a plurality of pixels, selects at least one candidate gamma table from the plurality of candidate gamma tables based on the detected value, determines a gamma value according to the selected at least one candidate gamma table for a pixel of the plurality of pixels, and generates and outputs a corrected pixel value of said pixel based on the gamma value and an original pixel value corresponding to said pixel, wherein the screen is configured to show a corrected video frame having said pixel with the corrected pixel value.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 8a shows a partial portion of a look-up table according to an embodiment of the present disclosure;

FIG. 8b shows a partial portion of another look-up table according to an embodiment of the present disclosure; and FIG. 8c shows a partial portion of further another look-up table according to an embodiment of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
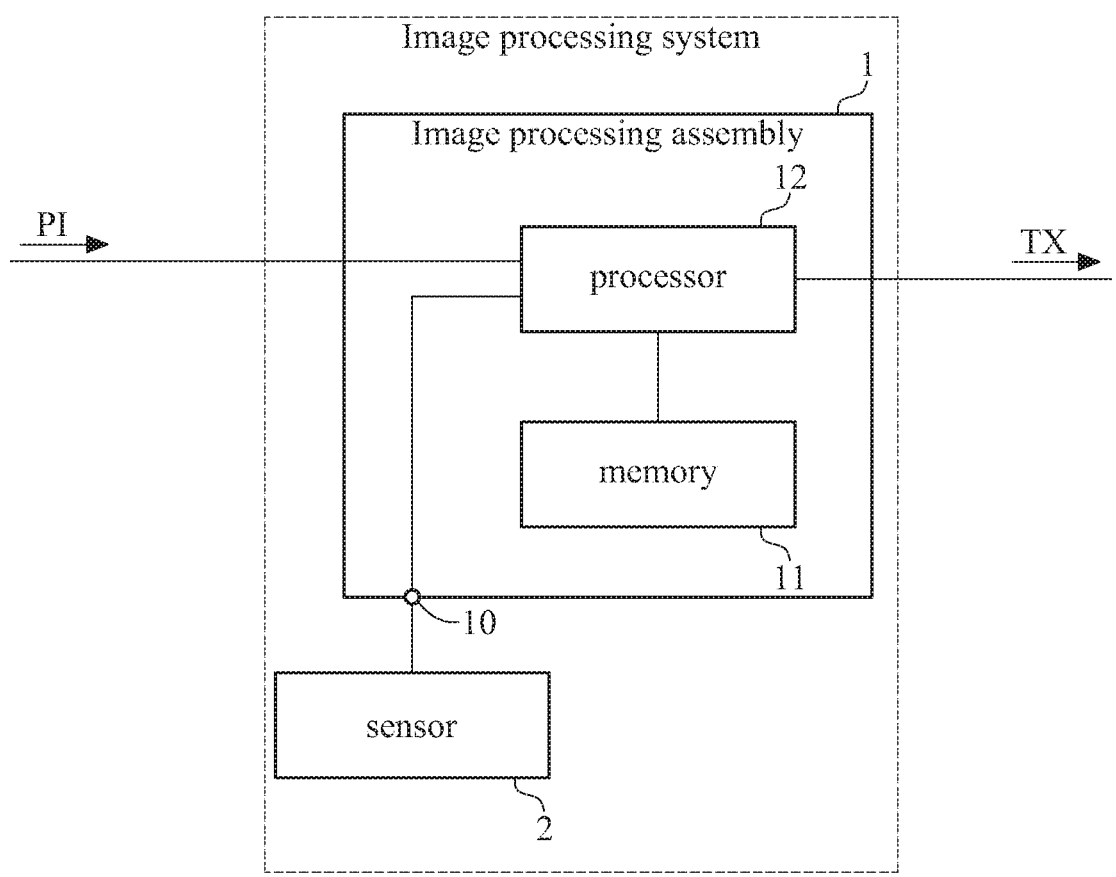
FIG. 1 is a schematic diagram illustrating an image processing assembly with auto-adjusting gamma value according to an embodiment of the present disclosure.

FIG. 1 is a schematic diagram of an image processing assembly with auto-adjusting gamma value according to an embodiment of the present disclosure. The image processing assembly 1 may be implemented as a timing controller which receives a pixel input signal PI and accordingly generates and sends a data control signal TX to a data driver for the control of a display panel, that is, a screen configured to show a video frame. In other embodiments, the image processing assembly 1 may be implemented as any type of image processing device. Specifically, for providing the data control signal TX with an automatic gamma value adjustment, the image processing assembly 1 comprises a detection input pin 10, a memory 11 and a processor 12. The detection input pin 10 is adapted for receiving a detected value dependent upon a view angle between a normal direction of a screen and a sight direction of a viewer to the screen. The detected value may represent an angle value of the view angel of the screen and/or the sight direction of the viewer to the screen. Alternatively, the detected value may be any angle value capable of reflecting the view angle, meaning that the detected value is dependent upon the view angle. Furthermore, the processor 12 can determine at least one gamma table according to the detected value received by the detection input pin 10. After receiving the original video frame, for each pixel thereof, the processor 12 generates a corrected pixel value based on an original pixel value of the original video frame and the gamma table. Each of the at least one gamma table may represent a gamma curve defining corresponding relationship between the original pixel value and the corrected pixel value. In other words, based on the corresponding relationship represented by the gamma table, the processor 12 can convert the original pixel value to corrected pixel value.

In some implementations, the memory 11 stores the at least one gamma table for mapping a plurality of original pixel values and a plurality of corrected pixel values, while the plurality of corrected pixel values can correspond to the plurality of original pixel values respectively. Although the memory 11 is shown to disposed within image processing assembly 1, in other embodiments, the memory 11 can be disposed outside image processing assembly 1. In different embodiments, the at least one gamma table may be implemented in hardware or alternatively, be implemented in software.

In an embodiment, the processor 12 can determine a single gamma table according to the detected value. The processor 12 can generate the corrected pixel value based on the original pixel value by referring to the gamma table.

In an embodiment, the processor 12 can determine a plurality of gamma tables (for example two gamma tables) according to the detected value. The processor 12 can generate the corrected pixel value based on the original pixel value by referring to one of the gamma tables corresponding to the location of a pixel. In a specific embodiment, the processor 12 can determine a first gamma table and a second gamma table. The processor 12 can generate the corrected pixel value based on the original pixel value by referring to the first gamma table when a pixel to be corrected is assigned to a first group based on its location. The processor 12 can generate the corrected pixel value based on the original pixel value by referring to the second gamma table when a pixel to be corrected is assigned to a second group based on its location. A look-up table may be applied to store the locations of the pixels assigned to the first and second groups.

Figure 2:
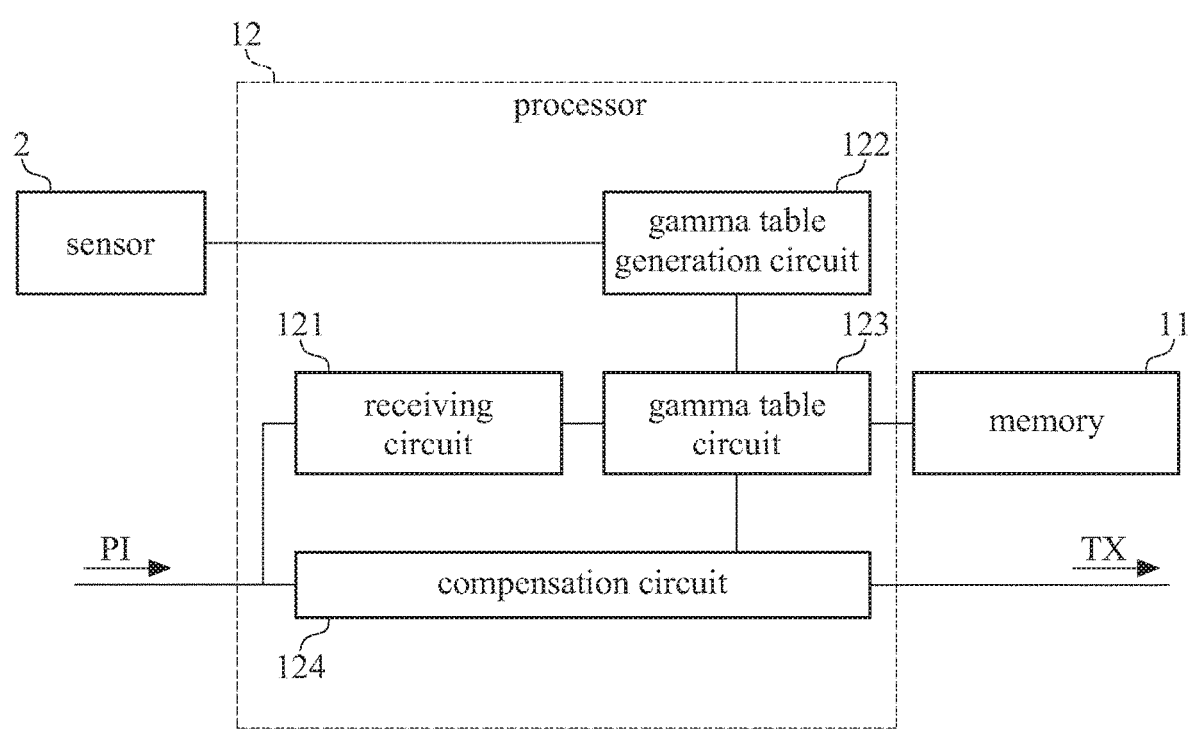
FIG. 2 is a schematic diagram of the processor according to an embodiment of the present disclosure.

Please further refer to FIG. 2, which shows a schematic diagram of the processor 12 according to an embodiment of the present disclosure. In this embodiment, the processor 2 may have a receiving circuit 121, a gamma table generation circuit 122, a gamma table circuit 123, and a compensation circuit 124. The receiving circuit 121 receives the pixel input signal PI to determine the location of each pixel of the original video frame sent by the pixel input signal PI. Furthermore, the receiving circuit 121 may access the look-up table to determine which one of the first and second groups that a pixel belongs to. The gamma table generation circuit 122 may electrically connect with the sensor 2 to generate a table reference based on the detected value. The gamma table circuit 123 may electrically connect with the receiving circuit 121, the gamma table generation circuit 122 and the memory 11. The gamma table circuit 123 is configured to obtain a gamma table from the memory 11 based on pixel location obtained by the receiving circuit 121 and the table reference from the gamma table generation circuit 122. The compensation circuit 124 also receives the pixel input signal PI to obtain the original pixel value. The compensation circuit 124 further electrically connects with the gamma table circuit 123 so as to compensate the original pixel value and generate the correct pixel value by referring to the gamma table.

More specifically, a dual gamma correction process may be performed, including different gamma corrections such as a first gamma correction and a second gamma correction, by referring to a plurality of gamma curves such as a high gamma curve and a low gamma curve, respectively. Various methods can be adopted to perform the dual gamma correction process according to design requirements. The dual gamma correction process may increase the viewable angle at side view. One of a plurality of gamma tables can be selected for each subpixel/pixel in the block. Adjacent processing units can be processed by different gamma tables, and different sizes of processed units can be arranged, such as one subpixel, two subpixel sand a pixel according to design requirements.

Figure 3:
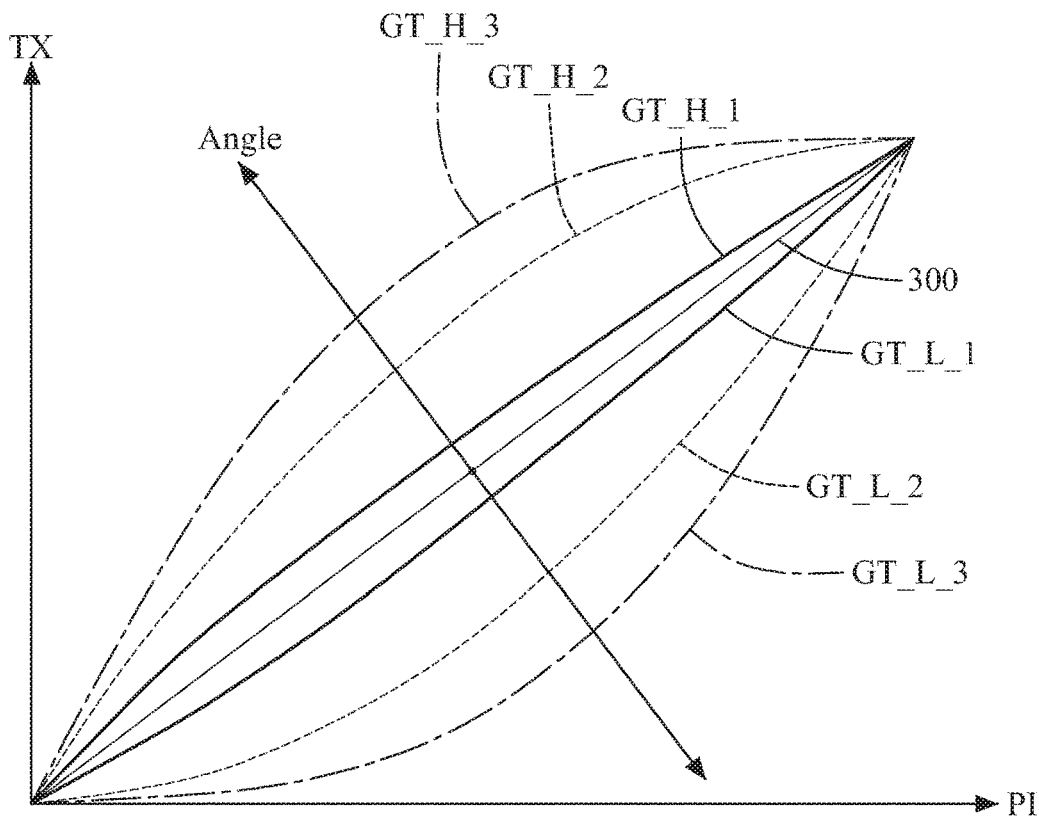
FIG. 3 shows curves corresponding to several gamma-high tables several gamma-low tables according to an embodiment of the present disclosure.

Please refer to FIG. 3, which illustrates curves corresponding to several gamma-high tables GT_H several gamma-low tables GT_L. As an example, said gamma-high tables GT_H may include three gamma-high tables GT_H_1 through GT_H_3 and are configured to be applied to the pixels assigned to one of the first and second groups. Oppositely, the gamma-low tables GT_L may include three gamma-low tables GT_L_1 through GT_L_3 and are configured to be applied to the pixels assigned to the other one of the first and second groups. Typically, a gap between the curves of a gamma-high table GT_H and a gamma-low table GT_L will become larger when the view angle between the normal direction of the screen and the sight direction of the viewer to the screen increases. In other words, when the view angle increases, the selected or generated gamma-high table and the selected or generated gamma-low table can be farer away from the central line 300.

Referring back to FIG. 2 and FIG. 3, in some implementations, the memory 11 stores a mapping table for mapping a plurality of candidate gamma tables (e.g., the gamma-high tables and gamma-low tables shown in FIG. 3) and a plurality of predetermined detected values (or predetermined ranges of detected values), while the plurality of candidate gamma tables can correspond to the plurality of predetermined detected values respectively. Although the memory 11 is shown to disposed within image processing assembly 1, in other embodiments, the memory 11 can be disposed outside image processing assembly 1. The processor 12 electrically connects with the detection input pin 10 and the memory 11 and receives an original video frame in the pixel input signal PI, with said original video frame including a plurality of pixels. The processor 12 can determine the at least one gamma tables according to the detected value by referring to the mapping table stored in the memory 11. In different embodiments, the mapping table may be implemented in hardware or alternatively, be implemented in software.

Figure 4:
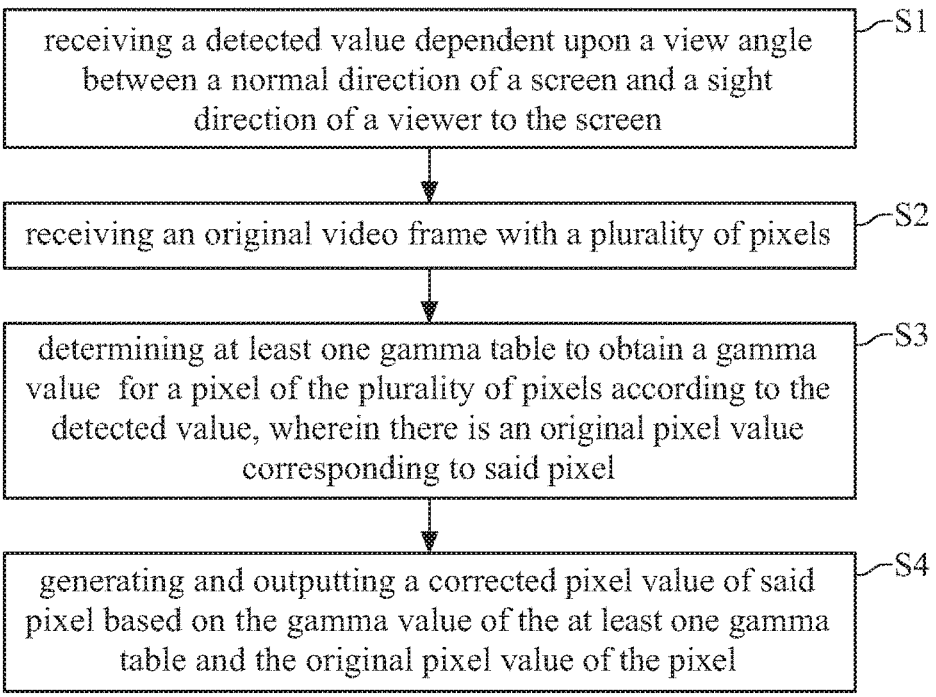
FIG. 4 is a flowchart illustrating an image processing method with auto-adjusting gamma value according to an embodiment of the present disclosure.

Please refer to FIGS. 1 and 4, while FIG. 4 shows a flowchart of an image processing method with auto-adjusting gamma value according to an embodiment of the present disclosure. In a step S1 of this embodiment, the detection input pin 10 receives the detected value. In a step S2, the processor 12 receives the original video frame, while said step S2 may be performed either after or before the step S1. In a step S3, the processor 12 determines at last one gamma table to obtain a gamma value for a pixel of the plurality of pixels according to the detected value, with said pixel corresponding to an original pixel value, and with the gamma table determined based on the detected value and the mapping table stored in the memory 10. Finally, in a step S4, the processor 12 generates a corrected pixel value based on the gamma value of the last one gamma table and the original pixel value of the pixel, so that the screen can show a corrected video frame having a pixel with the corrected pixel value. The location of the pixel with the corrected pixel value in the corrected video frame is identical to the location of the pixel with the original pixel value in the original video frame.

Figures 5, 6:
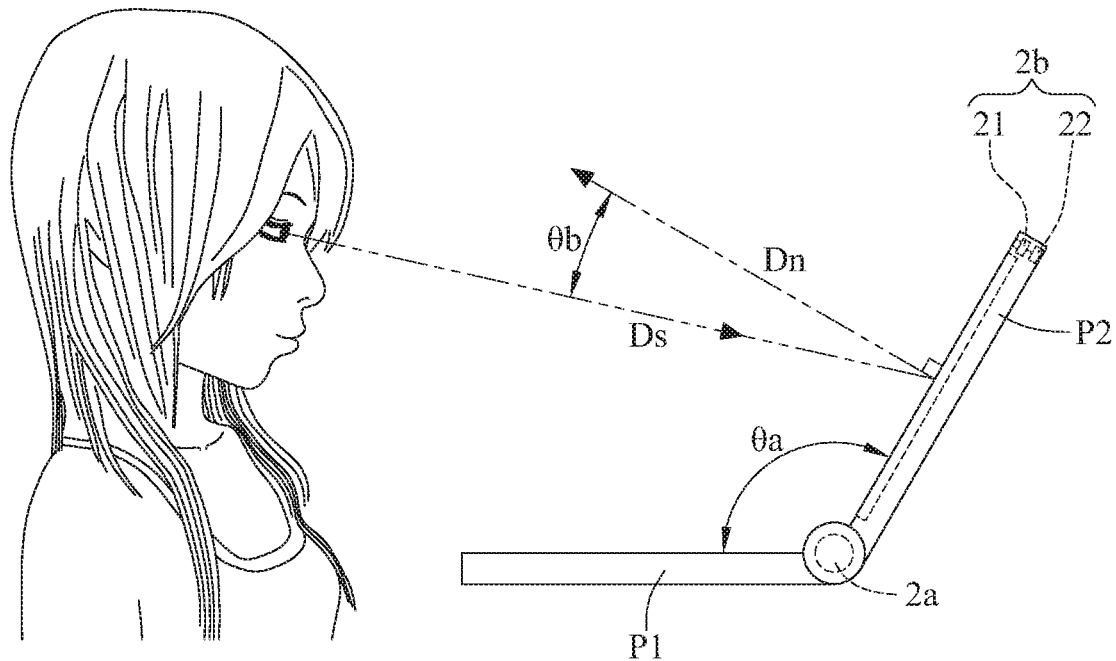
FIG. 5 is side view showing the situation while a viewer is using the display device with the image processing assembly according to the embodiment of the present disclosure.
FIG. 6 is a flowchart illustrating details about a step S3 in the flowchart of FIG. 2 according to an embodiment of the present disclosure.

Particularly, the detected value may be obtained as different measured values and depends on the type of the sensor 2. Please refer to FIG. 5 showing the situation while a viewer is using the display device with the image processing assembly of the present disclosure. In a first example of the sensor 2, there is a sensor 2a disposed in a bendable member such as a hinge linking two panels P1 and P2 to each other, with either of the two panels P1 and P2 serving as the screen. In this example, the sensor 2a detects an angle value of an angle θa between the two panels P1 and P2 and sends the angle value to the detection input pin 10 of the image processing assembly 1 to serve as the detected value. Specifically, in a normal situation as shown in FIG. 5, when the panel P1 is settled on a table, the angle θa is dependent upon a view angle αb between the normal direction Dn of the screen and the sight direction Ds of the viewer to the screen. In a second example of the sensor 2, there is a sensor 2b including a camera 21 and a controller 22 for directly detecting an angle value of the view angle αb. Specifically, in this example, the camera 21 takes a picture of the viewer and sends this picture to the controller 22, and the controller 22 calculates the angle value of the view angle αb by, as an example and not thus limited thereto, determining the location of the pupil of an eye related to the eye socket thereof.

Moreover, when the sensor 2 is implemented as the sensor 2b, a plurality of candidate angle values corresponding to a plurality of candidate view angles are serving as the predetermined detected values, and it is preferred that differences from gamma values in the candidate gamma tables to 1 and the candidate angle values are in positive correlation. Specifically, since the gamma value can be 1 by which the corrected pixel value equals the original pixel value when the sight direction Ds and the normal direction Dn are the same, the differences from the gamma values in a candidate gamma table to 1 should increase when the candidate angle value becomes larger.

As what is shown in FIG. 5, the two kinds of sensor 2, the sensors 2a and 2b, can be both disposed in the display device for the image processing method to be performed with either one of them. However, the image processing assembly 1 of the display device may have only one of the sensors 2a and 2b for cost saving. Furthermore, a combination of the image processing assembly 1 and the sensor 2 is defined as an image processing system in the present disclosure.

Regarding the step S3 of the embodiment of the image processing method as shown in FIG. 4, there may be two sub-steps S31 and S32 in the step S3 performed with the mapping table stored in the memory 11, which are shown in FIG. 6. In the sub-step S31, the processor 12 selects at least one candidate gamma table from the plurality of candidate gamma tables of the mapping table according to the detected value. In the sub-step S32, the processor 12 determines the gamma value according to the selected at least one candidate gamma table as well as the original pixel value. There may be two different ways to perform the sub-steps S31 and S32 and will be further discussed later. Specifically, said two different ways are possible ways for carrying out the sub-steps S31 and S32 instead of a limitation to the present disclosure.

In the first way, details about the sub-step S31 are: from the predetermined detected values in the mapping table, determining the closest predetermined detected value to the detected value, and taking the candidate gamma table corresponding to the closest predetermined detected value as said at least one candidate gamma table. Thereafter, in the first way, details about the sub-step S32 are: based on the original pixel value, taking a gamma value in the candidate gamma table corresponding to the closest predetermined detected value as the gamma value for the processor 12 to perform the step S4. With this first way, the processor 12 can generate the gamma value fast and provide an acceptable performance for solving the off-angle viewing problem.

In the second way for performing the sub-steps S31 and S32, the sub-step S31 may include: from the predetermined detected values in the mapping table, determining the closest two predetermined detected values to the detected value, and taking the two candidate gamma tables corresponding to the two closest predetermined detected values as the at least one candidate gamma table. Furthermore, the sub-step S32 in this second way includes: based on the original pixel value, determining two gamma values in the two candidate gamma tables corresponding to the two closest predetermined detected values, and calculating the gamma value by interpolation or extrapolation based on the detected value, the two closest predetermined detected values, and the two gamma values. Particularly, for a further discussion about the second way of the sub-step S32, the two closest predetermined detected values are defined as a first predetermined detected value and a second predetermined detected value, and the two candidate gamma tables are defined as a first candidate gamma table corresponding to the first predetermined detected value and a second candidate gamma table corresponding to the second predetermined detected value. Furthermore, based on the original pixel value, a first gamma value in the first gamma table can be determined, and a second gamma value in the second gamma table can also be determined. Thus, the calculation of the gamma value by interpolation or extrapolation results in that a ratio of a first difference between the first predetermined detected value and the detected value to a second difference between the detected value and the second predetermined detected value equals to another ratio of a third difference between the first gamma value and the gamma value to a fourth difference between the gamma value and the second gamma value. In the above calculation, the gamma value is obtained by interpolation when the detected value is between the first and second predetermined detected values, and the gamma value is obtained by extrapolation when the detected value is either smaller or larger than both of the first and second predetermined detected values. With this second way, the processor 12 can generate the gamma value more accurately, and thus provide a preferable performance for solving the off-angle viewing problem.

Figure 7:
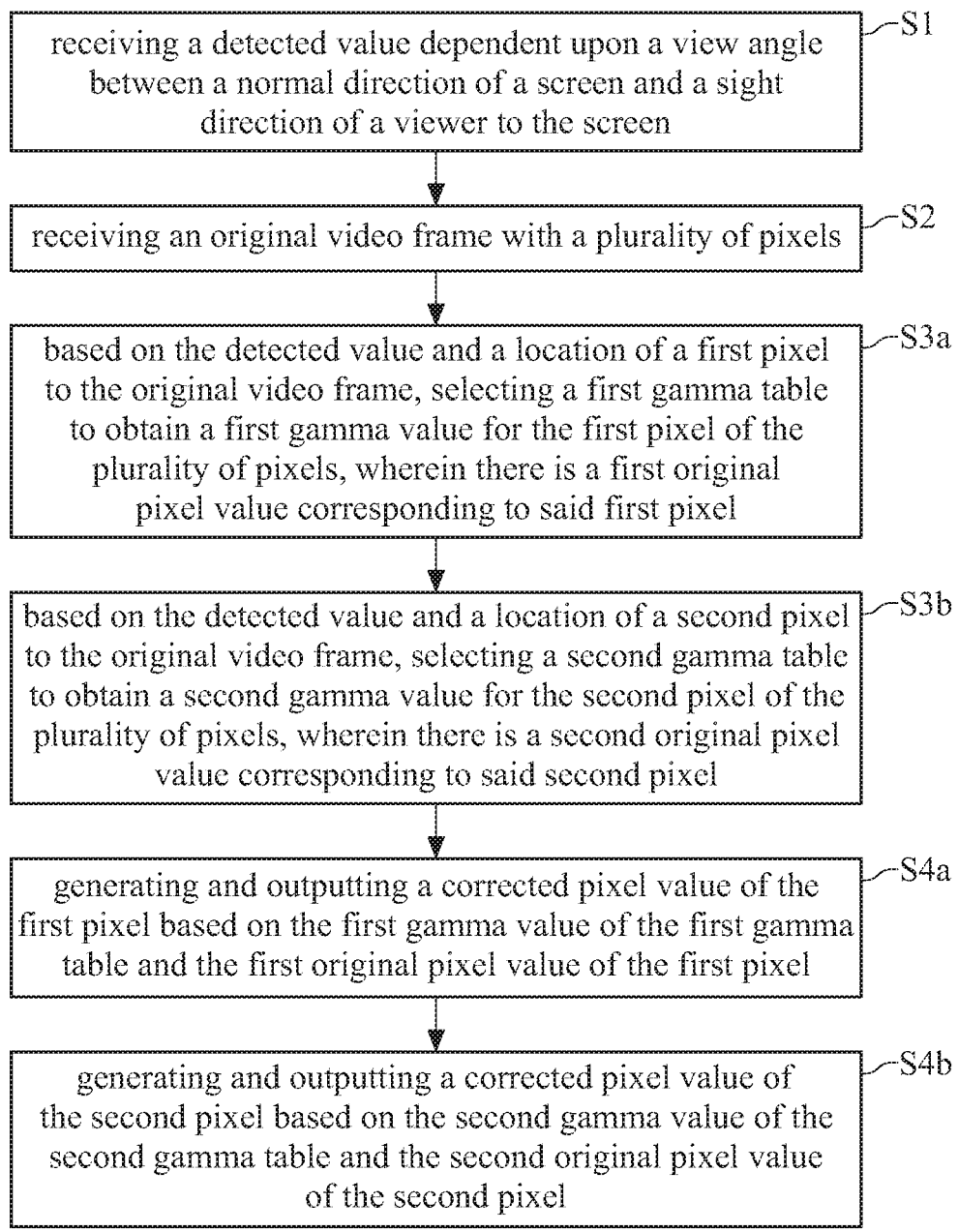
FIG. 7 is a flowchart illustrating an image processing method with auto-adjusting gamma value according to another embodiment of the present disclosure.

Please refer to FIG. 7, which shows a flowchart of the image processing method of another embodiment of the present disclosure. In comparison with the previous embodiment shown in FIG. 4, the present embodiment provides more than one gamma table for correcting the pixels of the original video frame. In this embodiment, the mapping table stored in the memory 11 includes the plurality of candidate gamma tables, defined as first candidate gamma tables now, and the plurality of predetermined detected values. Furthermore, the memory 11 also includes a plurality of second candidate gamma tables and a look-up table showing a first group including a part of the pixels of the original video frame, which are going to be corrected by first gamma values in one of the first candidate gamma tables, and a second group including others of said pixels going to be corrected by second gamma values in one of the second candidate gamma tables. Namely, the look-up table shows the locations of first pixels in the first group to the original video frame and the locations of second pixels in the second group to the original video frame. Similar to the gamma value obtained in the previous embodiment shown in FIG. 4, the first gamma value for a first pixel in the first group is determined based on the selected first candidate gamma table and the original pixel value, and the second gamma value for a second pixel in the second group is determined based on the selected second candidate gamma table and the original pixel value.

Specifically, in the flowchart shown in FIG. 7, the difference from the flowchart shown in FIG. 4 lies in that the step S3 in FIG. 4 is performed twice to generate the first gamma value for the first pixel in the first group (step S3a) and a second gamma value for the second pixel in the second group (step S3b), while the step S4 in FIG. 4 is also performed twice to generate a corrected pixel value of the first pixel (step S4a) and a corrected pixel value of the second pixel (step S4b). In this embodiment, the discussed ways for performing the steps S3 and S4 can also be carried out for the steps S3a, S3b, S4a and S4b. Furthermore, in the look-up table, the number of groups each having different gamma table may be determined according to the need, thus the two groups are referred as an example and said number of groups is not limited thereto. With the above details of this embodiment, the display device can largely mitigate or eliminate the unwanted grid phenomenon.

Figures 8A, 8B, 8C:
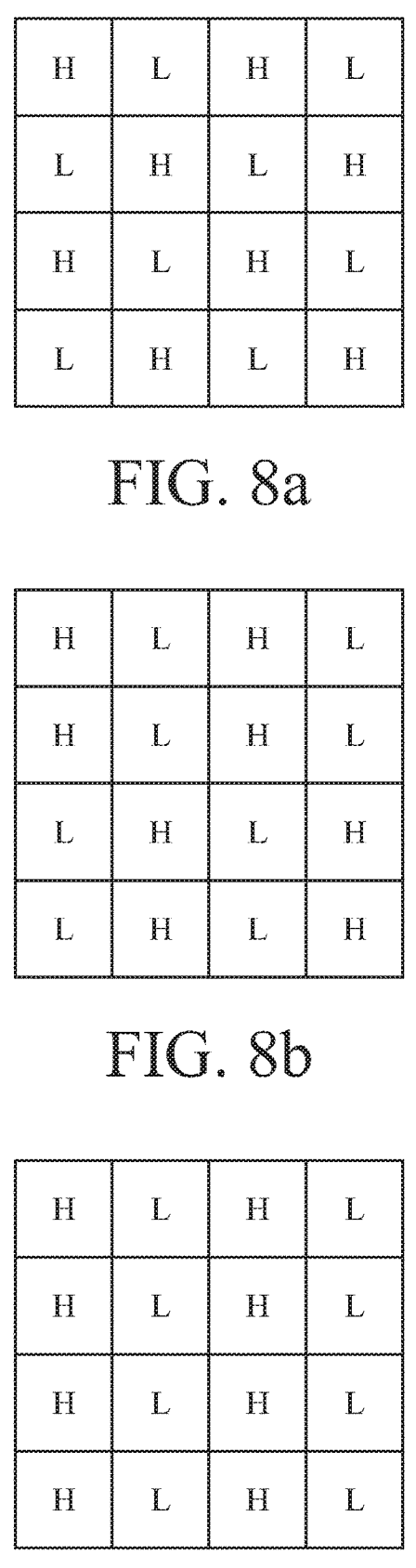

Specifically, please refer to FIGS. 8a, 8b and 8c, which illustrate three possible partial portions of the look-up table. In FIGS. 8a, 8b and 8c, each grid represents one pixel, and a grid with "H" represents that the pixel is assigned to a group with pixels applying the gamma-high tables GT_H while a grid with "L" represents that the pixel is assigned to a group with pixels applying the gamma-low tables GT_L. The dual gamma correction process may include different gamma corrections such as a first gamma correction and a second gamma correction, by referring to a plurality of gamma curves such as a high gamma curve and a low gamma curve, respectively. Various methods can be adopted to perform the dual gamma correction process according to design requirements. The dual gamma correction process may increase the viewable angle at side view. One of a plurality of gamma tables can be selected for each subpixel/pixel in the block. Adjacent processing units can be processed by different gamma tables, and different sizes of processed units can be arranged, such as one subpixel, two subpixel sand a pixel according to design requirements.

In view of the foregoing descriptions, by implementing the image processing method, assembly and system disclosed in the present disclosure, the off-angle viewing problem due to the change in the view angle between the normal direction of the screen and the sight direction of the viewer to the screen can be solved automatically. Furthermore, with what are disclosed, the original pixel value of the original video frame will be corrected rapidly and precisely once the detected value dependent upon the view angle changes, so that the viewer need not to repeatedly move or rotate the screen for a preferred visual performance.

What is claimed is:

1. An image processing method with auto-adjusting gamma value, with said image processing method configured to be performed by an image processing assembly, comprising:
receiving a detected value dependent upon a view angle between a normal direction of a screen and a sight direction of a viewer to the screen;
receiving an original video frame with a plurality of pixels;
determining at least one gamma table to obtain a gamma value for a pixel of the plurality of pixels according to the detected value, wherein there is an original pixel value corresponding to said pixel; and
generating and outputting a corrected pixel value of said pixel based on the gamma value of the at least one gamma table and the original pixel value of the pixel, wherein the screen is configured to show a corrected video frame having said pixel with the corrected pixel value, wherein the at least one gamma table comprises a first gamma table and a second gamma table, the pixel is a first pixel, the original pixel value is a first original pixel value, wherein determining the at least one gamma table to obtain the gamma value for the pixel of the plurality of pixels according to the detected value comprises: based on the detected value and a location of the first pixel to the original video frame, selecting the first gamma table as the at least one gamma table to obtain a first gamma value as the gamma value for the first pixel of the plurality of pixels,
wherein the image processing method further comprises:
based on the detected value and a location of a second pixel to the original video frame, selecting the second gamma table to obtain a second gamma value for the second pixel of the plurality of pixels, wherein there is a second original pixel value corresponding to the second pixel; and
generating and outputting a corrected pixel value of the second pixel based on the second gamma value of the second gamma table and a second original pixel value of the second pixel.

2. The image processing method with auto-adjusting gamma value according to claim 1, wherein the detected value indicates an angle value of an angle between two panels linked to each other, wherein either of the two panels serves as the screen.

3. The image processing method with auto-adjusting gamma value according to claim 2, wherein the angle value is generated by and sent from a sensor in a bendable member linking the two panels respectively, with the sensor detecting the angle between the two panels to obtain the angle value.

4. The image processing method with auto-adjusting gamma value according to claim 1, wherein the detected value indicates an angle value of the view angle between the normal direction of the screen and the sight direction of the viewer to the screen.

5. The image processing method with auto-adjusting gamma value according to claim 4, wherein the angle value is generated by and sent from a controller connecting to a camera, with the controller configured to calculate the angle value of the view angle.

6. The image processing method with auto-adjusting gamma value according to claim 1, wherein determining the at least one gamma table to obtain the gamma value for the pixel according to the detected value comprises:
    selecting at least one candidate gamma table from a plurality of candidate gamma tables according to the detected value; and
    determining the gamma value according to the selected at least one candidate gamma table and the original pixel value.

7. The image processing method with auto-adjusting gamma value according to claim 6, wherein the plurality of candidate gamma tables corresponds to a plurality of predetermined detected values respectively, and selecting the at least one candidate gamma table from the plurality of candidate gamma tables according to the detected value comprises:
    determining a closest one of the plurality of predetermined detected values to the detected value; and
    taking one of the plurality of candidate gamma tables corresponding to the closest predetermined detected value as said at least one candidate gamma table.

8. The image processing method with auto-adjusting gamma value according to claim 7, wherein determining the gamma value according to the selected at least one candidate gamma table and the original pixel value comprises: based on the original pixel value, taking a gamma value in the candidate gamma table corresponding to the closest predetermined detected value as the gamma value.

9. The image processing method with auto-adjusting gamma value according to claim 6, wherein the plurality of candidate gamma tables corresponds to a plurality of predetermined detected values respectively, and selecting the at least one candidate gamma table from the plurality of candidate gamma tables according to the detected value comprises:
    determining closest two of the plurality of predetermined detected values to the detected value; and
    taking two of the plurality of candidate gamma tables corresponding to the two closest predetermined detected values as said at least one candidate gamma table.

10. The image processing method with auto-adjusting gamma value according to claim 9, wherein determining the gamma value according to the selected at least one candidate gamma table and the original pixel value comprises:
    based on the original pixel value, determining two gamma values in the two candidate gamma tables corresponding to the two closest predetermined detected values; and
    calculating the gamma value by interpolation or extrapolation based on the detected value, the two closest predetermined detected values and the two gamma values.

11. The image processing method with auto-adjusting gamma value according to claim 6, wherein the detected value indicates an angle value of the view angle between the normal direction of the screen and the sight direction of the viewer to the screen, the plurality of candidate gamma tables corresponds to a plurality of predetermined detected values respectively, the plurality of predetermined detected values respectively corresponds to a plurality of candidate angle values of a plurality of candidate view angles, and differences from gamma values in the candidate gamma tables to 1 and the candidate angle values are in positive correlation.

12. The image processing method with auto-adjusting gamma value according to claim 1, wherein selecting the first gamma table to obtain the first gamma value for the first pixel and selecting the second gamma table to obtain the second gamma value for the second pixel comprises:
    according to the detected value, selecting at least one first candidate gamma table and at least one second candidate gamma table from a mapping table having a plurality of first candidate gamma tables, a plurality of second candidate gamma tables, and a plurality of predetermined detected values, wherein each predetermined detected value is corresponding to a respective one of the plurality of first candidate gamma tables and a respective one of the plurality of second candidate gamma tables;
    determining the first gamma value according to the selected at least one first candidate gamma table and the original pixel value; and
    determining the second gamma value according to the selected at least one second candidate gamma table and the original pixel value.

13. An image processing assembly with auto-adjusting gamma value comprising:
    a memory storing a plurality of candidate gamma tables and a plurality of predetermined detected values, with the plurality of candidate gamma tables corresponding to the plurality of predetermined detected values respectively;
    a processor electrically connecting to the memory, receiving a detected value dependent upon a view angle between a normal direction of a screen and a sight direction of a viewer to the screen and an original video frame having a plurality of pixels, selecting at least one candidate gamma table from the plurality of candidate gamma tables based on the detected value, determining a gamma value according to the selected at least one candidate gamma table for a pixel of the plurality of pixels, and generating and outputting a corrected pixel value of said pixel based on the gamma value and an original pixel value corresponding to said pixel, wherein the screen is configured to show a corrected video frame having said pixel with the corrected pixel value, wherein the memory has a mapping table comprising the plurality of candidate gamma tables and the plurality of predetermined detected values.

14. The image processing assembly with auto-adjusting gamma value according to claim 13, wherein the detected value indicates an angle value of the view angle between the normal direction of the screen and the sight direction of the viewer to the screen, the plurality of predetermined detected values respectively corresponds to a plurality of candidate angle values of a plurality of candidate view angles, and differences from gamma values in the candidate gamma tables to 1 and the candidate angle values are in positive correlation.

15. An image processing system with auto-adjusting gamma value comprising:
    the image processing assembly according to claim 13; and
    a sensor electrically connecting to the image processing assembly and generating the detected value.

16. The image processing system with auto-adjusting gamma value according to claim 15, wherein the sensor is arranged in a bendable member linking two panels respectively, the detected value indicates an angle between the two panels, and the sensor detects said angle for generating the detected value.

17. The image processing system with auto-adjusting gamma value according to claim 15, wherein the sensor comprises a camera and a controller, the controller electrically connects to the camera and the processor and calculates the view angle between the normal direction of the screen and the sight direction of the viewer to the screen.

* * * * *